Feb. 10, 1953 M. RETTINGER 2,628,286

MAGNETIC HEAD CONSTRUCTION

Filed March 24, 1950 2 SHEETS—SHEET 1

MICHAEL RETTINGER
INVENTOR.

BY

ATTORNEY.

Feb. 10, 1953 M. RETTINGER 2,628,286

MAGNETIC HEAD CONSTRUCTION

Filed March 24, 1950 2 SHEETS—SHEET 2

MICHAEL RETTINGER
INVENTOR.

BY Val R. Goshaw

ATTORNEY

Patented Feb. 10, 1953 2,628,286

UNITED STATES PATENT OFFICE 2,628,286

MAGNETIC HEAD CONSTRUCTION

Michael Rettinger, Encino, Calif., assignor to Radio Corporation of America, a corporation of Delaware Application March 24, 1950, Serial No. 151,567

9 Claims. (Cl. 179—100.2)

This invention relates to magnetic transducers, and particularly to a magnetic recording and reproducing head of relatively small size.

Closed core types of magnetic transducers or heads are well-known. A head of this type has a core with a front or working gap and a rear or demagnetizing gap, around which core are windings upon which signal voltages are impressed for recording, and in which signal voltages are induced for reproduction. The present invention is directed to a magnetic transducer or head, which may have various thicknesses so that up to twelve heads can be mounted in a line transversely of a thirty-five millimeter film to provide twelve tracks. When only three heads are used, each track will have a width of approximately .2 inch.

The construction provides a head of unusually high quality performance with a frequency response range from 30 to 18,000 cycles, high sensitivity, the minimum of microphonics, low bias current requirements, and with a low hum level. It is also economical to manufacture, since it is constructed of a number of identical parts which may be stamped, and a minimum number of parts for each head. The head may be used for either recording or reproducing with equal efficiency.

The principal object of the invention, therefore, is to provide an improved magnetic transducer.

Another object of the invention is to provide an economical construction for producing a highly sensitive and efficient magnetic recording and reproducing head with a minimum performance variation between heads.

A further object of the invention is to provide a magnetic head of the ring or closed core type having a minimum number of components and of miniature size.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
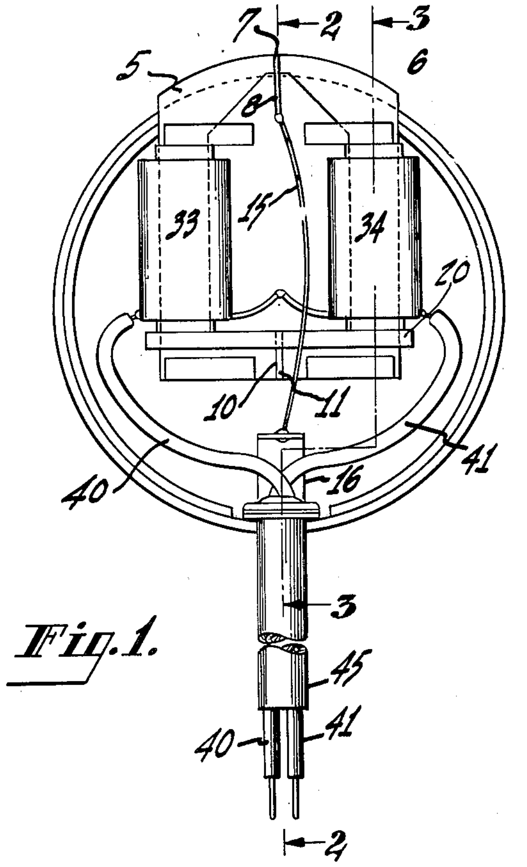
Fig. 1 is a front view of a magnetic transducer embodying the invention.
Figure 3:
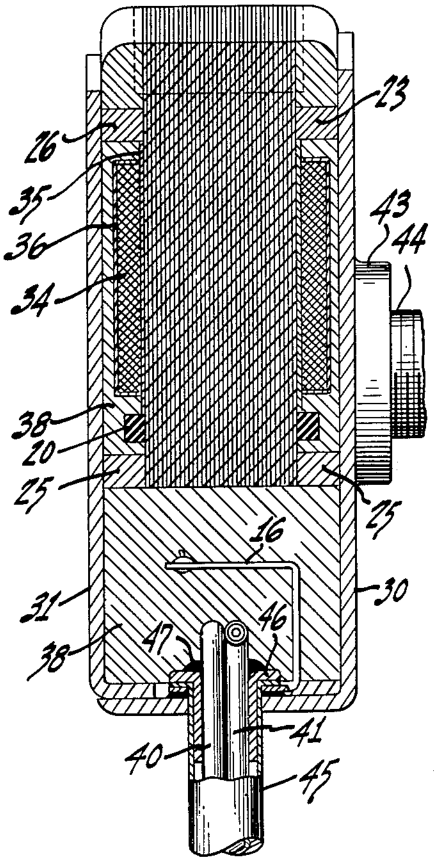
Fig. 3 is a cross-sectional view taken along the line 3—3 of Fig. 1.
Figure 2:
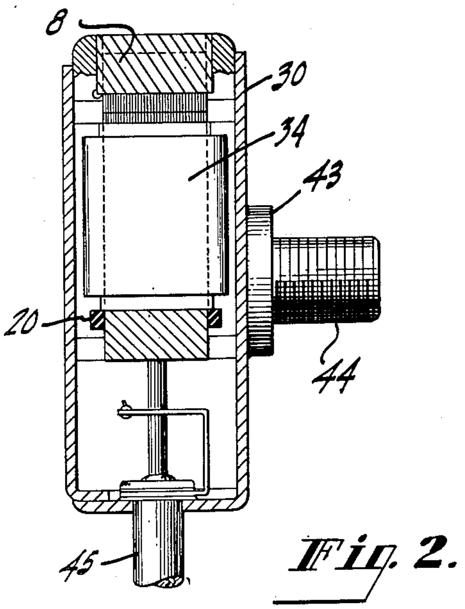
Fig. 2 is a cross-sectional view taken along the line 2—2 of Fig. 1.

Referring now to the drawings, in which the same numerals identify like elements, the head has a closed type of core of two identical sections 5 and 6, which provide a front gap 7, formed by a non-magnetic spacer 8, and a rear gap 10, formed by a non-magnetic spacer 11, such as plastic. The front gap is provided between the indentured front pole tips, which assure a constant pole face width for all practical amounts of grinding or lapping, which must be done at the gap to make it flat.

Figure 4:
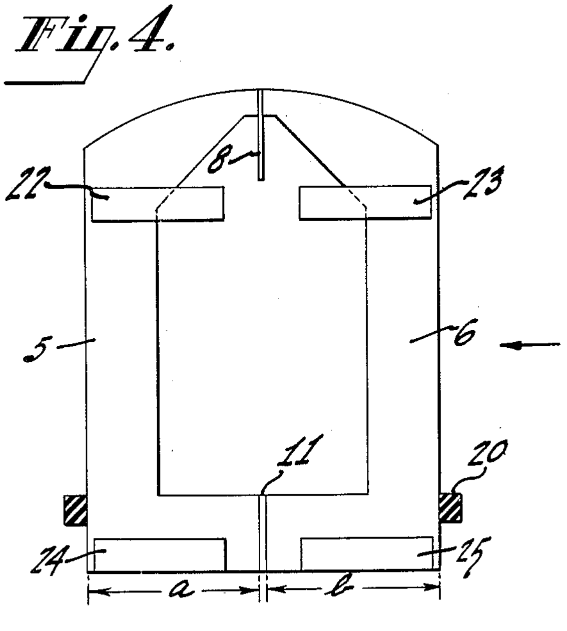
Fig. 4 is a front view showing the core and core spacer elements.
Figure 5:
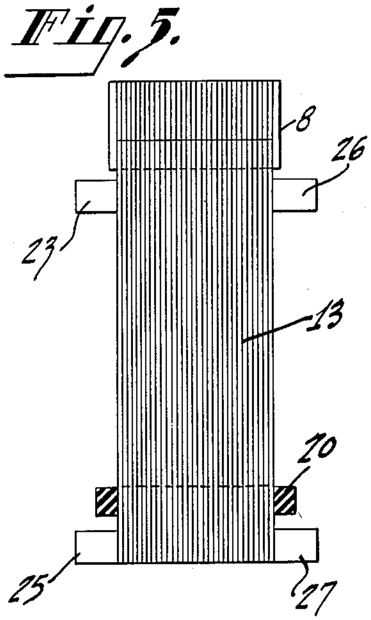
Fig. 5 is an end view of the core of Fig. 4, showing the core laminations.

The spacer 8 is of beryllium copper, which is as hard, if not harder, than the molybdenum Permalloy laminations 13 (see Fig. 5) making up the core sections 5 and 6. This prevents the corner of the laminations from burring over the gap when ground and polished, as occurs when the spacer 8 is of some soft material, such as aluminum or plastic. Another feature of the core is that the width of the sections 5 and 6, such as the dimensions $a$ and $b$ shown in Fig. 4, is approximately five mils less than the similar dimension of the pole piece sections. Since the width of the front gap 7 or the thickness of the spacer 8 is .2 of a mil, and the width of the rear gap 10 or the thickness of spacer 11 is ten mils, the gap 8 remains a rectangular parallelepiped no matter how much the pole pieces of the head are worn. In the past, the ends of the laminations have been milled of the same width, with the result that when the rear gap was made wider than the front gap, the front gap was tapered or wedge-shaped, and thus, as the front gap was worn, it became wider with an accompanying decrease in high frequency sensitivity. The core section pole tips have a constant cross-sectional area to facilitate grinding of the tip ends of every core without increasing the thickness of the pole tips, as would occur if the tips were tapered to the gap.

Figure 6:
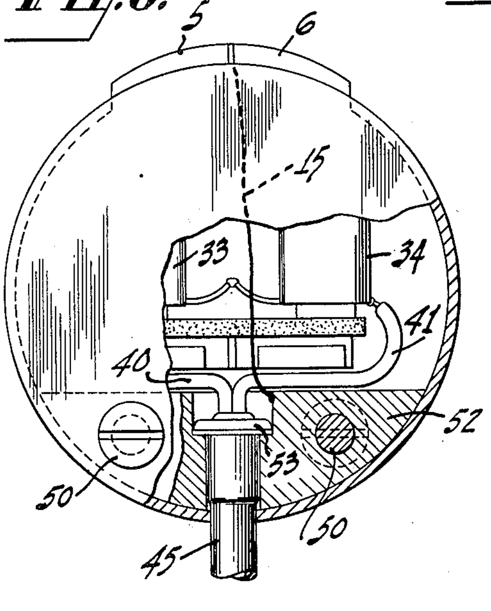
Fig. 6 is a front view, partly in cross-section, of a modification of a magnetic transducer embodying the invention.
Figure 7:
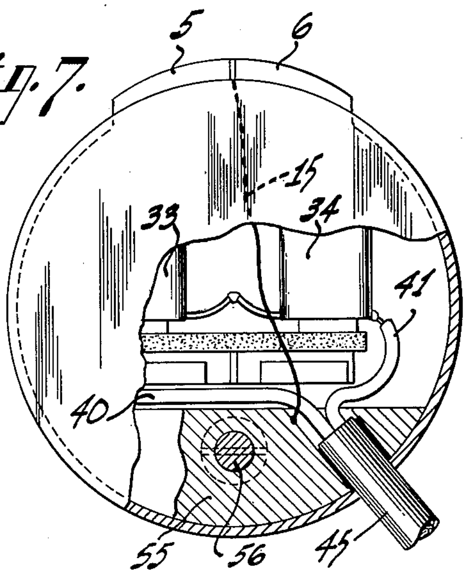
Fig. 7 is a front view, partly in cross-section, of another modification of a magnetic head embodying the invention.

As shown in Fig. 1, the beryllium copper spacer 8 is grounded over conductor 15 to a U-shaped bracket or connector 16, which is connected to the grounded cable shield of the conductors. By grounding this spacer, electrostatic charges built up by the friction of the magnetizable record medium may leak off and prevent introduction of noise during the recording or the reproduction of a magnetic record. Similar leakage conductors for the heads shown in Figs. 6 and 7 are provided.

The laminations 13 are held in position with respect to the spacers 8 and 11 by an elastic medium 20, such as rubber, positioned around the rear gap ends of sections 5 and 6. Positioned on each side thereof are insulating spacers 22, 23, 24, 25, 26, and 27, which space the core between the inner faces of telescoping sections 30 and 31 of the Mumetal shield. Around each straight portion of the core sections 5 and 6, coils 33 and 34 are wound, a layer of insulating paper 35 being positioned between the core and windings, the windings also being covered by a similar insulating layer of paper or similar material 36. After these elements are assembled, the core is embedded in a plastic, as shown at 38, which acts as a bonding agent to hold the assembled elements in fixed position with respect to one another, and also, as the bonding agent between the two telescoping Mumetal shield sections 30 and 31, which comprise the housing shield for the head. The pole pieces of the core extend through upper openings in the sections 30 and 31, but are not in contact with the sections.

In addition to the elements above mentioned, the portions of the conductor leads 40 and 41 within the shield are embedded in the plastic. The plastic used is a modified ethoxyline resin, which is a highly polymerized neutral substance which has no corrosive effect on metals, exhibits great adhesion to the materials involved, and has a high mechanical strength and good durability. It has a dielectric constant of 3.7 at fifty cycles, and 3.6 at one megacycle at twenty-two degrees centigrade, which is practically equivalent to that of quartz. By the use of this plastic, there is no metallic contact between the core and the head mount, which is a stud 43 welded to the side of the outer shield section 30, and which has a threaded portion 44. This isolation of the head elements prevents the head from being microphonic.

The conductors 40 and 41 extend through the shield sections 30 and 31 in a flexible metallic shield 45, the end of the shield being wedged between the bracket 16 and an eyelet 46, the conductors 40 and 41 then being sealed in the eyelet by a sealing material 47. This form of head uses no clamps or screws, and has a minimum of parts, which may be made from stampings. A head having a size seven-eighths of an inch in diameter, five-sixteenths of an inch thick, and a volume of three cubic centimeters was used to record and reproduce three parallel magnetic tracks when placed in line transversely of a thirty-five millimeter magnetizable film. The stud 43 may be threaded to a ball and socket mount so that the working gap may be oriented to its proper position with respect to the record medium.

Referring now to Figs. 6 and 7, a similar type of head having the same core sections 5 and 6 and coils 33 and 34, together with the other structural features, is provided with a different type of Mumetal shield. This shield has two sections, each of which is of the same diameter so that their edges abut one another. In Fig. 6, a brass mounting block 52 has the sections attached thereto, the front section being attached by a pair of screws 50, and the back section by a pair of similar screws. The conductors 40 and 41 and shield 45 pass through a hole at the center of the block 52, and the shield is held firmly in contact with the block 52 by an eyelet and ring combination 53. This construction, however, requires tapping of screw holes in the block 52, and the provision of screws to hold the shield sections in position.

In Fig. 7, a brass block 55, similar to block 52, is provided, except that only a single screw, such as shown at 56, will hold each shield section to the block. In this instance, the shield 45 and conductors 40 and 41 are brought out at an angle with respect to the axes of the core sections 5 and 6. This angle of exit of the conductors from the windings may be desirable dependent upon the particular use and space available in the recorder or reproducer in which the heads are employed.

As mentioned above, this type of head construction provides a high quality unit having a frequency response range extending to 18,000 cycles with high sensitivity. It is substantially free from microphonics, requires a low bias current, and because of its small size, has a low noise level. The construction of the type of head shown in Figs. 1 to 5, inclusive, employs no machined parts, such as mechanical clamps, terminal blocks, etc., which make the manufacture thereof economical. Such machined parts, if used, would make the head larger.

I claim:

1. In combination, two groups of stacked laminations to form a closed magnetic path, each group having one end thereof L-shaped and the other end thereof tapered outwardly at approximately forty-five degrees with pole tips having a constant cross-sectional area over abutting portions thereof, a non-magnetic spacer between the pole tips and a non-magnetic spacer between the L-shaped ends of said groups, windings positioned on the intermediate portions of said groups, a housing surrounding said groups and said windings, the pole tips extending through an opening in said housing, and plastic material intermediate said laminations, said windings, and said housing.

2. A combination in accordance with claim 1, in which said first mentioned non-magnetic spacer is approximately .2 of a mil thick and said second mentioned spacer is approximately 10 mils thick.

3. A combination in accordance with claim 2, in which said .2 of a mil non-magnetic spacer is grounded to said housing.

4. A combination in accordance with claim 3, in which a second opening is provided in said housing, a pair of conductors extending from said windings through said opening, and a metallic shield for said conductors, said shield being connected to said housing and to said grounding conductor for said spacer.

5. A combination in accordance with claim 1, in which said housing is substantially circular and a mounting stud is attached at substantially the center of said shield.

6. A magnetic head comprising two core sections to form a closed magnetic path, each section having one end thereof L-shaped and the other end thereof tapered at approximately forty-five degrees with pole tips having a constant cross-sectional area over abutting portions thereof, a non-magnetic spacer between the pole tips and a non-magnetic spacer between the L-shaped ends of said sections, windings positioned on the intermediate portions of said sections, a housing surrounding said sections and said windings, the pole tips extending through an opening in said housing, and plastic material intermediate said core sections, said windings, and said housing.

7. A magnetic head in accordance with claim 6, in which spacers are employed between said core sections and said housing to maintain said core sections in proper alignment with respect to said housing when said plastic material is applied thereto.

8. A magnetic head in accordance with claim 6, in which said housing comprises telescoping sections, said plastic material bonding said sections in position.

9. A magnetic head in accordance with claim 6, in which said housing comprises opposing abutting sections and a mounting block is provided to which said sections are attached.

MICHAEL RETTINGER.

REFERENCES CITED

The following references are of record in the file of this patent:

UNITED STATES PATENTS

| Number | Name | Date |
|---|---|---|
| 2,263,485 | Clopton | Nov. 18, 1941 |
| 2,277,305 | Clopton | Mar. 24, 1942 |
| 2,413,108 | Latchford | Dec. 24, 1946 |
| 2,469,444 | Roys | May 10, 1949 |
| 2,493,742 | Begun | Jan. 10, 1950 |
| 2,508,485 | Begun | May 23, 1950 |
| 2,513,617 | Begun | July 4, 1950 |
| 2,513,653 | Kornei | July 4, 1950 |
| 2,549,771 | Camras | Apr. 24, 1951 |
| 2,555,110 | Bobb | May 29, 1951 |

FOREIGN PATENTS

| Number | Country | Date |
|---|---|---|
| 725,830 | Germany | Sept. 30, 1942 |